P. H. WEBBER.
TONGUE SUPPORT.
APPLICATION FILED APR. 27, 1914.
1,128,393.
Patented Feb. 16, 1915.
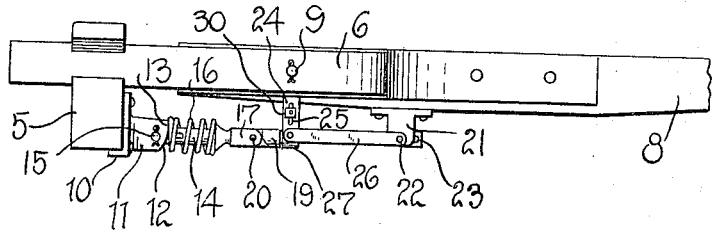
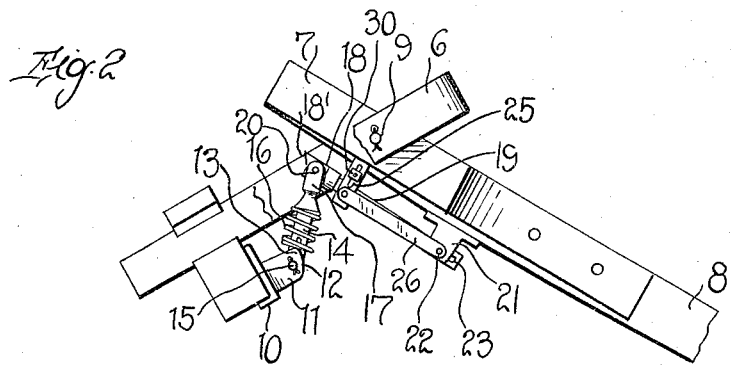
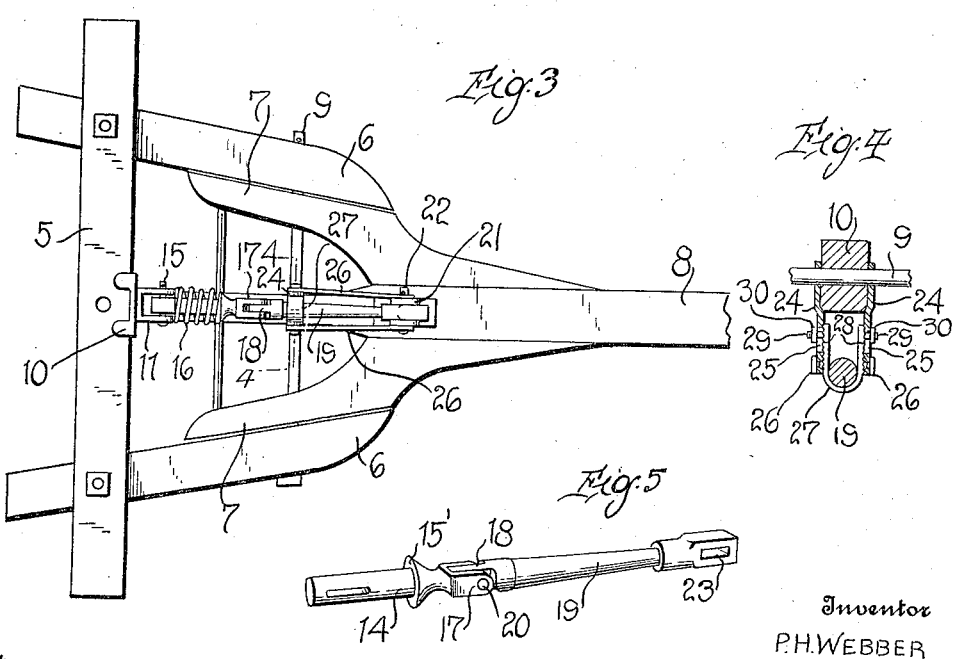
Witnesses
Robert M. Sutphen
A. J. Hind
Inventor
P.H. WEBBER
By Watson E. Coleman
Attorney

UNITED STATES PATENT OFFICE.

PHILIP H. WEBBER, OF HOOPESTON, ILLINOIS.

TONGUE-SUPPORT.

1,128,393.   Specification of Letters Patent.   Patented Feb. 16, 1915.

Application filed April 27, 1914. Serial No. 834,773.

*To all whom it may concern:*

Be it known that I, PHILIP H. WEBBER, a citizen of the United States, residing at Hoopeston, in the county of Vermilion and State of Illinois, have invented certain new and useful Improvements in Tongue-Supports, of which the following is a specification, reference being had to the accompanying drawings.

This invention relates to an improved tongue support of that character disclosed in my prior Patent, No. 968,010 issued Aug. 23, 1910, and application Serial No. 785,116 filed Aug. 16, 1913.

The present invention has for its primary object to materially simplify the construction of my prior devices, increase their efficiency in practical operation, and at the same time reduce the manufacturing cost thereof to a minimum.

My invention has for another and more particular object to provide a tongue or pole support, the parts of which are so constructed and arranged as to maintain a direct pressure of the tongue upon a vehicle axle when the tongue is in its normal position, but which will nevertheless, readily yield when the wagon body is tilted to dump the contents thereof so that the forward end of the tongue will not be elevated.

The invention has for a further object to provide a device of the above character which will permit of oscillating movement of the tongue with respect to the body of the vehicle when the same passes over rough or uneven roads.

The invention has for a further object to eliminate the use of springs so far as is possible, and other parts which might be easily broken, whereby the necessity for frequent repairs is obviated, and the durability of the device as a whole increased.

With the above and other objects in view, the invention consists in novel features of construction, combination, and arrangement of parts as will be hereinafter referred to and more particularly pointed out in the specification and claims.

For a full understanding of the invention, reference is to be had to the following description and accompanying drawing, in which—

Figure 1 is a side elevation of the hounds of a vehicle frame illustrating the mounting of the tongue and the application of my invention thereto; Fig. 2 is a similar view showing the relative position of the parts when the wagon body is tilted to dump the contents thereof; Fig. 3 is a bottom plan view; Fig. 4 is a section taken on the line 4—4 of Fig. 3; and Fig. 5 is a perspective view of the hingedly-connected rods.

Referring in detail to the drawing, 5 designates the front axle of the wagon or other vehicle, and 6 indicates the forward ends of the hounds which are mounted upon the axle in the usual manner. Between the hounds 6 the arms 7 which are bolted, or otherwise rigidly fixed to the rear end of the bolt or tongue 8, are disposed. These arms are pivotally mounted upon a transverse bolt 9, which is fixed at its ends in the hounds 6.

To the front face of the vehicle axle and centrally thereof, a bracket plate 10 is rigidly secured, and upon this plate spaced, forwardly-projecting ears 11 are integrally formed. Each of these ears is provided with an opening 12, and it is to be particularly noted that the forward end edges of these ears are angularly disposed so that the upper rounded corner 13 of the ear is disposed in advance of the plane of the lower corner of said ear, which latter corner is located in alinement with the opening 12. One end of the cylindrical rod 14 has a transversely-disposed pin 15 arranged therein, the ends of which are mounted in the openings 12 of the respective ears. Adjacent the other end of said rod, the same is formed with a shoulder 15' which provides a bearing for one end of a heavy spring 16 mounted upon said rod. The latter or forward end of this rod 14 is forked or bifurcated, as shown at 17, and to the same a reduced flattened ear 18 formed on a second rod 19 is pivotally connected by means of the transverse pin 20. The ear 18 is provided upon its end with a longitudinally-projecting stop plug 18' which is adapted to bear against the other rod 14 and limit the relative pivotal movement of said rods in one direction.

To the under side of the vehicle tongue 8 a plate having depending ears 21 formed thereon is secured. The ears of this plate are connected by a pin 28 which is disposed through an elongated slot 23 formed in the forward end of the rod 19. By the provision of this slot in the end of the rod, it will be manifest that the tongue is capable of a slight tilting or oscillating movement with respect to the pivotally connected rods between the forward ends of the hounds 6.

Spaced stirrup bars 24 are engaged at their upper ends on the transverse bolt 9 and are provided in their lower end portions with longitudinal slots 25. These bars are connected by links 26 to the ends of the transverse pin 22 mounted in the ears 21. 27 designates an adjustable U-shaped stirrup loop, the arms of which are disposed between the depending bars 24. The contacting faces of said bars and the arms of the loop are preferably notched or serrated, as indicated at 28, and in the ends of the loop arms threaded bolts 29 are secured.

Clamping nuts 30 engage upon the outer ends of said bolts which project through the slots 25 in the bars 24. It will be obvious that by simply adjusting said nuts upon the bolts, the arms of the loop 27 may be tightly clamped upon the bars 24, the co-engaged teeth or serrations 28 effectually preventing longitudinal slipping movement of the loop with respect to the spaced bars.

Having now fully described the several structural features of the invention, its operation may be explained as follows: Assuming that the pole or tongue 8 is in its normal position, and the body of the wagon, or other vehicle, disposed horizontally upon its supporting frame, it will be observed that a line connecting the pivot 20 between the rods 14 and 19 and the pivot pin 15 which is mounted in the rear end of said rod 14, is below the point of bearing contact of the rear end of the spring 17 upon the upper curved corners 13 of the ears 11. Thus, it will be manifest that said spring 17 will exert a downward pressure against the joint or pivotal connection between the rods 14 and 19, and hold said latter rod in contact with the bight portion of the loop 28. The tongue 8, however, may oscillate between the forward ends of the hounds 6 in the passage of the wagon over rough roads or across ditches, without breaking the joint between said rods, for the reason above described.

Referring now to Fig. 2 of the drawing, it will be noted that when the wagon body is tilted upon the axle to an inclined position of substantially 45° in order to dump the contents thereof, at the start of such tilting movement, the pivot joint between the rods 14 and 19 is broken and forced upwardly. The rear end of the spring 17 moving upon the forwardly-projecting corners of the ears 11 to a position above the same, is compressed. Thus, when the wagon body is returned to its normal horizontal position, the spring 17 by its expansive action forces downwardly upon the pivot joint between the rods 14 and 19, and returns the same to its normal position below the horizontal plane of the point of contact of the rear end of said spring against the ears 11. It will be understood that as the wagon body is tilted, the stirrup loop 28 connected to the pole or tongue pulls upwardly upon the rear end of the rod 19 adjacent to the pivot 20, thus breaking the joint at the desired point in the tilting movement of the vehicle body.

From the foregoing description taken in connection with the accompanying drawing, it is believed that the construction, manner of operation, and several advantages of my invention will be clearly and fully understood. By arranging the single coil spring 17 so that the same bears upon the ears 11 in which the rod 14 is pivoted at a point above the pivot, I eliminate the necessity of employing an additional spring in order to hold the pivotally connected rods against relative movement when the wagon body is in its normal position. It will therefore be appreciated that by means of the present invention I have materially simplified the device as heretofore constructed, and also obtain greater efficiency in practical operation. The invention may be very easily and quickly applied to dumping wagons now in general use for the transportation of grain to farm elevators or other analogous purpose. Owing to the extreme simplicity of the construction of the device, the same is rendered highly durable in use, light in weight and capable of manufacture at a minimum cost.

While I have above described the preferred form, construction, and arrangement of the several elements employed, it will be understood that the device is nevertheless susceptible of considerable modification therein, and I therefore reserve the privilege of resorting to all such legitimate changes as may be fairly embodied within the spirit and scope of the invention as claimed.

What is claimed is:

1. The combination with the vehicle hounds and supporting axle, a tongue pivotally mounted between the hounds, of a tongue support comprising two members pivotally connected to each other at one of their ends, the other ends of said members being pivotally mounted upon the tongue and axle respectively, and means carried by one of said members and normally exerting a downward pressure upon the pivot joint of said members to prevent their relative pivotal movement in one direction.

2. The combination with the vehicle hounds and supporting axle, a tongue pivotally mounted between the hounds, a tongue support comprising two members pivotally connected to each other at one of their ends, one of said members being pivotally mounted at its other end upon the vehicle axle, the other of said members being pivotally and slidably mounted at its other end upon the vehicle tongue, a stirrup depending from the tongue and adapted to exert an upward pull upon said latter member to move said members with respect to each other when the vehicle hounds are tilted, and a coil spring mounted upon said first-named member and normally exerting a downward pressure upon the pivotally connected ends of said members to hold the same against such relative movement.

3. The combination with the vehicle hounds and supporting axle, a tongue pivotally mounted between the hounds, of a tongue support comprising two members pivotally connected to each other at one of their ends, a bearing secured upon the vehicle axle, one of said members being pivotally mounted at its rear end in said bearing, the other of said members being pivotally mounted at its forward end upon the vehicle tongue, a spring arranged upon said first-named member and engaging said bearing at a point above the pivot of said first-named member, a stirrup depending from the tongue in which said second-named member is arranged, said spring exerting a forward downward pressure against the pivot joint between said members to prevent an upward movement of the same out at their ends, said joint being broken when the vehicle hounds and tongue are moved to relatively inclined position, and means for adjusting said stirrup to vary the point in the tilting movement of the tongue at which the connection between said members is broken.

4. The combination with the vehicle hounds and supporting axle, a tongue pivotally mounted between the hounds, a tongue support comprising two rods pivotally connected at one of their ends to each other, one of said rods being provided with a stop lug to engage the other rod and prevent relative movement of the rods in one direction, spaced-bearing ears in which the rear end of one of said rods is pivotally mounted, the forward edges of said ears being inclined, a spring arranged upon said rod, and bearing against the inclined edges of the ears above the pivot of said rod, said rod being provided with a shoulder against which the other end of said spring bears to exert a forward downward pressure against the pivotally connected ends of said rods, the other of said rods being pivotally and slidably mounted upon the vehicle tongue, and a depending adjustable stirrup in which the rear end of said latter rod is disposed whereby the same exerts an upward pull upon said rod and breaks the pivot joint between the rods when the vehicle hounds and the tongue assume relatively inclined positions.

In testimony whereof I hereunto affix my signature in the presence of two witnesses.

PHILIP H. WEBBER.

Witnesses:
JOHN B. WALLBRIDGE,
ROBERT F. COOPER.

Copies of this patent may be obtained for five cents each, by addressing the "Commissioner of Patents, Washington, D. C."